B. R. BENJAMIN.
METHOD OF TREATING THE FINGER BARS FOR MOWERS.
APPLICATION FILED JUNE 30, 1910.

995,432.

Patented June 20, 1911.

Witnesses:
F. W. Hoffmeister
C. C. Palmer

Inventor
Bert R. Benjamin
By E. W. Burgess
Attorney

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

METHOD OF TREATING THE FINGER-BARS FOR MOWERS.

995,432.   Specification of Letters Patent.   Patented June 20, 1911.

Application filed June 30, 1910.   Serial No. 569,623.

*To all whom it may concern:*

Be it known that I, BERT R. BENJAMIN, a citizen of the United States, residing at Oak Park, in the county of Cook and State of Illinois, have invented a certain new and useful Method of Treating the Finger-Bars for Mowers, of which the following is a specification.

My invention relates to a method of treating the finger bars for mowers whereby the stiffness thereof is materially increased and the serviceability of the bar in operation lengthened.

It consists in a combined heat and mechanical treatment of the bar in order to stiffen it in a manner to effectively resist strains to which it may be subjected in operation; the object of my invention being to produce a bar having a maximum of rigidity with a minimum weight. This object I attain by means of the method hereinafter described and illustrated by the accompanying drawings, in which—

Figure 1:
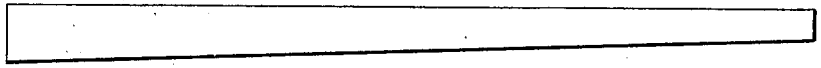
Figure 2:
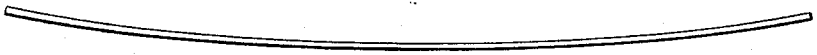
Figure 3:
Figure 4:
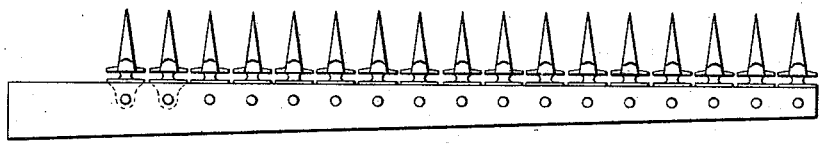

Figure 1 represents a plan view of the blanks from which the finger bars are formed; Fig. 2 represents the blank after it has been heated and curved from end to end; Fig. 3 represents the bar after pressure has been applied to straighten it; and Fig. 4 is a plan view of the finished article with the fingers attached.

The finger bars for mowers as commonly constructed are usually made from flat slabs of steel having a uniform thickness throughout their length, a straight front edge to which the fingers are attached, and a gradually reduced width from the stubbleward end of the bar toward the grainward end thereof, the stubbleward end of the bar being secured to an inner shoe that is pivotally attached to the coupling frame of a mower in a manner to rise and fall as it follows the uneven surface of the ground, the outer end of the bar being secured to a shoe that rides upon the ground. Means are provided upon the mower frame for raising the finger bar and cutting apparatus in order that it may pass over what would otherwise obstruct it, and also to raise the finger bar to a vertical position in some constructions. As the finger bar is connected at its inner or stubbleward end only with the supporting and elevating means, the weight thereof, with the associated parts of the cutting apparatus carried thereby, has a tendency to cause the bar to bend or droop downward at its outer or grassward end, causing undue friction between the sickle and fingers and otherwise impairing the efficiency of the machine.

To counteract the above noted structural defects, and to provide a finger bar so constituted that it will successfully resist severe strains incident to continued use thereof, is accomplished by the practice of my improved method of treating the bar, that consist in: first: heating the bar to a degree of temperature whereby it may be readily bent then giving it a gradual curve from end to end in a direction opposite to that in which a maximum degree of rigidity is required and to that of the active force or elements tending to bend the bar downward at its grassward end in the operation of the machine; second: by cooling the bar while it is maintained in its curved form, then reducing the curve by pressure while the bar is in a cool state and until the bar is substantially straight and a permanent set is imparted thereto.

What I claim as my invention, and desire to secure by Letters Patent, is:

The method of treating a finger bar for mowers, consisting in heating and bending it to a predetermined degree of curvature in a direction opposite to that in which maximum rigidity is required, cooling the bar while maintained in its curved form and then while in a cool state straightening it by pressure to impart a permanent set thereto.

BERT R. BENJAMIN.

Witnesses:
RAY D. LEE,
LUD HOLLAND-LETZ.

---

Copies of this patent may be obtained for five cents each, by addressing the "Commissioner of Patents, Washington, D. C."